US012210886B2

(12) United States Patent
Puram et al.

(10) Patent No.: US 12,210,886 B2
(45) Date of Patent: Jan. 28, 2025

(54) AUTOMATED TESTCASE EXECUTION

(71) Applicant: Dell Products L.P., Round Rock, TX (US)

(72) Inventors: Subhashini Puram, Hyderabad (IN); Aashna Mohapatra, Bhubaneswar (IN); Sanjukta De, Gurgaon (IN); Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 257 days.

(21) Appl. No.: 17/837,418

(22) Filed: Jun. 10, 2022

(65) Prior Publication Data

US 2023/0401074 A1 Dec. 14, 2023

(51) Int. Cl.
*G06F 9/451* (2018.01)
*G06F 3/041* (2006.01)
*G06F 11/36* (2006.01)

(52) U.S. Cl.
CPC ............ *G06F 9/451* (2018.02); *G06F 3/0416* (2013.01); *G06F 11/3684* (2013.01); *G06F 11/3688* (2013.01)

(58) Field of Classification Search
None
See application file for complete search history.

(56) References Cited

U.S. PATENT DOCUMENTS

| | | | |
|---|---|---|---|
| 2004/0225995 A1* | 11/2004 | Marvin | G06F 8/41 717/100 |
| 2008/0072100 A1* | 3/2008 | Okada | G06F 11/3414 714/E11.193 |
| 2008/0168430 A1* | 7/2008 | Browne | G06F 9/454 717/137 |
| 2011/0088018 A1* | 4/2011 | Foley | G06F 11/3684 717/124 |
| 2014/0096014 A1* | 4/2014 | Johnson | H04L 67/75 715/733 |
| 2019/0303269 A1* | 10/2019 | Arieli | G06F 11/3672 |
| 2020/0379891 A1* | 12/2020 | Canter | G06F 8/71 |
| 2021/0342147 A1* | 11/2021 | Singh | G06F 9/451 |
| 2023/0311322 A1* | 10/2023 | Marinovici | B25J 9/1671 700/264 |

\* cited by examiner

*Primary Examiner* — Anh-Tuan V Nguyen
(74) *Attorney, Agent, or Firm* — Daly, Crowley, Mofford & Durkee, LLP.

(57) ABSTRACT

A method, comprising: detecting a selection of one or more user interface (UI) controls in a user interface of an application; retrieving a respective property value set for each of the selected UI controls, the respective property value set for any of the selected UI controls including respective values of one or more properties of the selected UI control; generating a control file, the control file including one or more UI control definitions, each of the UI control definitions corresponding to a different one of the selected UI controls, each of the UI control definitions being generated based on the respective property value set for the UI control that corresponds to the UI control definition; and generating a repository class including one or more handles, each of the handles being configured to return an object corresponding to a different one of the selected UI controls.

20 Claims, 7 Drawing Sheets

136

```
Test.cs
[TestMethod]
[DeploymentItem ("ObjectsFinder.json)]
...
Public void WPFTest2() ←——702
{
    Repository repo = new Repository();
    UITestControl formWindow=Microsoft.VisualStudio.UITesting.ApplicationUnderTest.Launch("./contact_info_form.exe");
    CodedUICommonMethods CM = new CodedUICommonMethods();

CM.SelectFirstName(repo.FirstName, "Oscar"); ←——710

CM.SendKeys(repo.AddressLine1, "1 Elm St."); ←——720

CM.SendKeys(repo.WorkPhone, "401.001.0001"); ←——730
}
...
```

FIG. 3

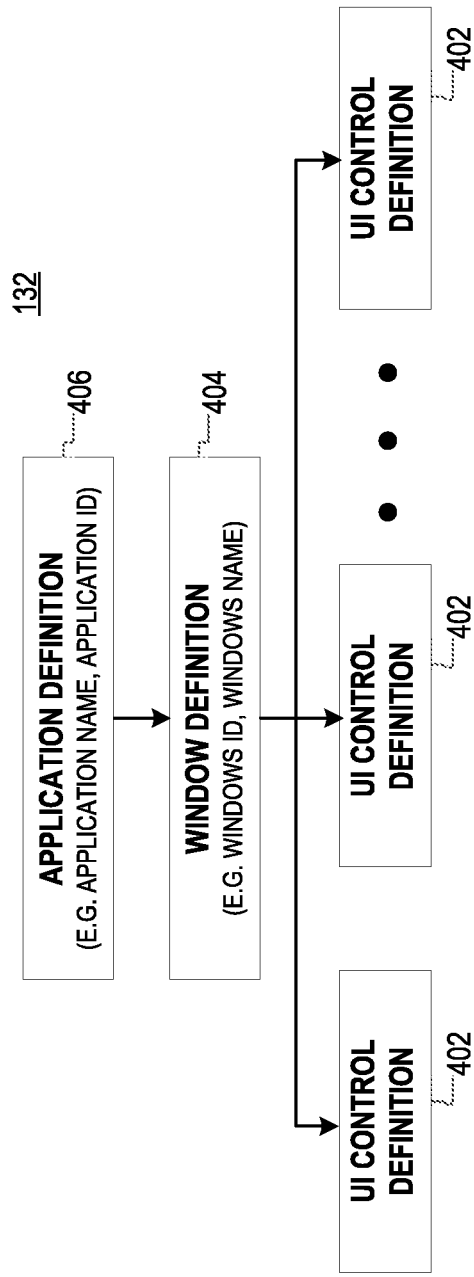

ObjectFinder.json

```
{
    ...
    "MYCRMFirstName": {"Name: first_name | TechnologyName: MSAA: ControlType: Edit"},
              512       514                                                    510
    "MYCRMAddressLine1": {"Name: address_line_1 | TechnologyName: MSAA: ControlType: Edit"},
              522                524                                                    520
    "MYCRMAddressWorkPhone": {"Name: work_phone | TechnologyName: MSAA: ControlType: Edit"},
              532                  534                                                 530
    ...
}
```

FIG. 5

Repository.cs
Class Repository

```
{
    ...
    public WinWindow CRMWindow {get {return this.parentwindow();}}   ~601
    public WinEdit FirstName {get {return wpffinder1.GetSpecificControl<WinEdit>("MYCRMFirstName", CRMWindow);}}   ~610
    public WinEdit Addressline1 {get {return wpffinder.GetSpecificControl<WinEdit>("MYCRMAddressline1", CRMWindow);}}   ~620
    public WinEdit AddressWorkPhone {get {return wpffinder.GetSpecificControl<WinEdit>("MYCRMWorkphone", CRMWindow);}}   ~630
}
```

FIG. 6

```
Test.cs
[TestMethod]
[DeploymentItem ("ObjectsFinder.json")]
...
Public void WPFTest2()  ←——702
{
    Repository repo = new Repository();
    UITestControl formWindow=Microsoft.VisualStudio.UITesting.ApplicationUnderTest.Launch("./contact_info_form.exe");
    CodedUICommonMethods CM = new CodedUICommonMethods();

CM.SelectFirstName(repo.FirstName, "Oscar");  ←——710

CM.SendKeys(repo.AddressLine1, "1 Elm St.");  ←——720

CM.SendKeys(repo.WorkPhone, "401.001.0001");  ←——730
    ...
}
```

AUTOMATED TESTCASE EXECUTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Functional tests are frequently used in the development of software applications. Functional tests drive an application through its interface to determine if the application is operating correctly. Examples of software development tools for performing functional tests include Coded UI™, Selenium™, and Appium™.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

According to aspects of the disclosure, a method is provided, comprising: detecting a selection of one or more user interface (UI) controls in a user interface of an application; retrieving a respective property value set for each of the selected UI controls, the respective property value set for any of the selected UI controls including respective values of one or more properties of the selected UI control; generating a control file, the control file including one or more UI control definitions, each of the UI control definitions corresponding to a different one of the selected UI controls, each of the UI control definitions being generated based on the respective property value set for the UI control that corresponds to the UI control definition; and generating a repository class including one or more handles, each of the handles being configured to return an object corresponding to a different one of the selected UI controls, each of the handles being generated based on a different one of the UI control definitions that are part of the control file.

According to aspects of the disclosure, a system is provided, comprising: one or more processors configured to perform the operations of: detecting a selection of one or more user interface (UI) controls in a user interface of an application; retrieving a respective property value set for each of the selected UI controls, the respective property value set for any of the selected UI controls including respective values of one or more properties of the selected UI control; generating a control file, the control file including one or more UI control definitions, each of the UI control definitions corresponding to a different one of the selected UI controls, each of the UI control definitions being generated based on the respective property value set for the UI control that corresponds to the UI control definition; and generating a repository class including one or more handles, each of the handles being configured to return an object corresponding to a different one of the selected UI controls, each of the handles being generated based on a different one of the UI control definitions that are part of the control file.

According to aspects of the disclosure, a non-transitory computer-readable medium is provided that stores one or more processor-executable instructions which, when executed, by one or more processors cause the one or more processors to perform the operations of: detecting a selection of one or more user interface (UI) controls in a user interface of an application; retrieving a respective property value set for each of the selected UI controls, the respective property value set for any of the selected UI controls including respective values of one or more properties of the selected UI control; generating a control file, the control file including one or more UI control definitions, each of the UI control definitions corresponding to a different one of the selected UI controls, each of the UI control definitions being generated based on the respective property value set for the UI control that corresponds to the UI control definition; and generating a repository class including one or more handles, each of the handles being configured to return an object corresponding to a different one of the selected UI controls, each of the handles being generated based on a different one of the UI control definitions that are part of the control file.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 3 is a diagram of the user interface of an application, according to aspects of the disclosure;

FIG. 4 is a diagram of an example of a control script, according to aspects of the disclosure;

FIG. 5 is a diagram of an example of a control script, according to aspects of the disclosure;

FIG. 6 is a diagram of a repository class, according to aspects of the disclosure;

FIG. 7 is a diagram of a test class, according to aspects of the disclosure.

DETAILED DESCRIPTION

Testing automation can be used to test web applications and other programs. Irrespective of the technologies used to build a web application, the web application will emit an HTML form with a Document Object Model (DOM) structure. Since web applications are exposed in an HTML form and elements are visible, it is comparatively easy to read the elements and map them in test automation tools.

By contrast, in Desktop applications, such as Windows™ desktop or Java Swing™ applications, the parameters of user interface (UI) controls may be encoded (or formatted) using an encoding (or formatting) scheme that is specific to the technology used to create the user interface components (e.g., Oracle Forms, Java Swing, Windows Presentation Foundation (WPF), etc.). This makes the automation of UI test cases more difficult. Although there are available UI automation tools for desktop applications, these tools tend to provide UI test automation for one type of technology for creating UI controls, and they are not compatible with multiple technologies.

Some desktop UI test automation tools that are available on the market adopt a record-and-replay approach to the testing of UI controls. Such tools record user inputs that are made to the UI of an application and then replay the inputs. The user inputs are recorded by scraping the user interface of the application and capturing the attributes of UI controls that are part of the interface. However, in general, the recording of user inputs yields a large and complex body of information, which is difficult to use by software engineers. Most of the time, a software engineer will need only a small portion of the information that is recorded, and sifting through the entire body of information to locate the needed portion could be very time-consuming and difficult.

The present disclosure proposes a technique that captures only the properties of "required UI controls", while omitting the capturing of unnecessary information, thus simplifying the whole testing automation process for desktop applications. In another aspect, the proposed technique is compatible with multiple technologies for the creation of user interfaces.

Figure 1:
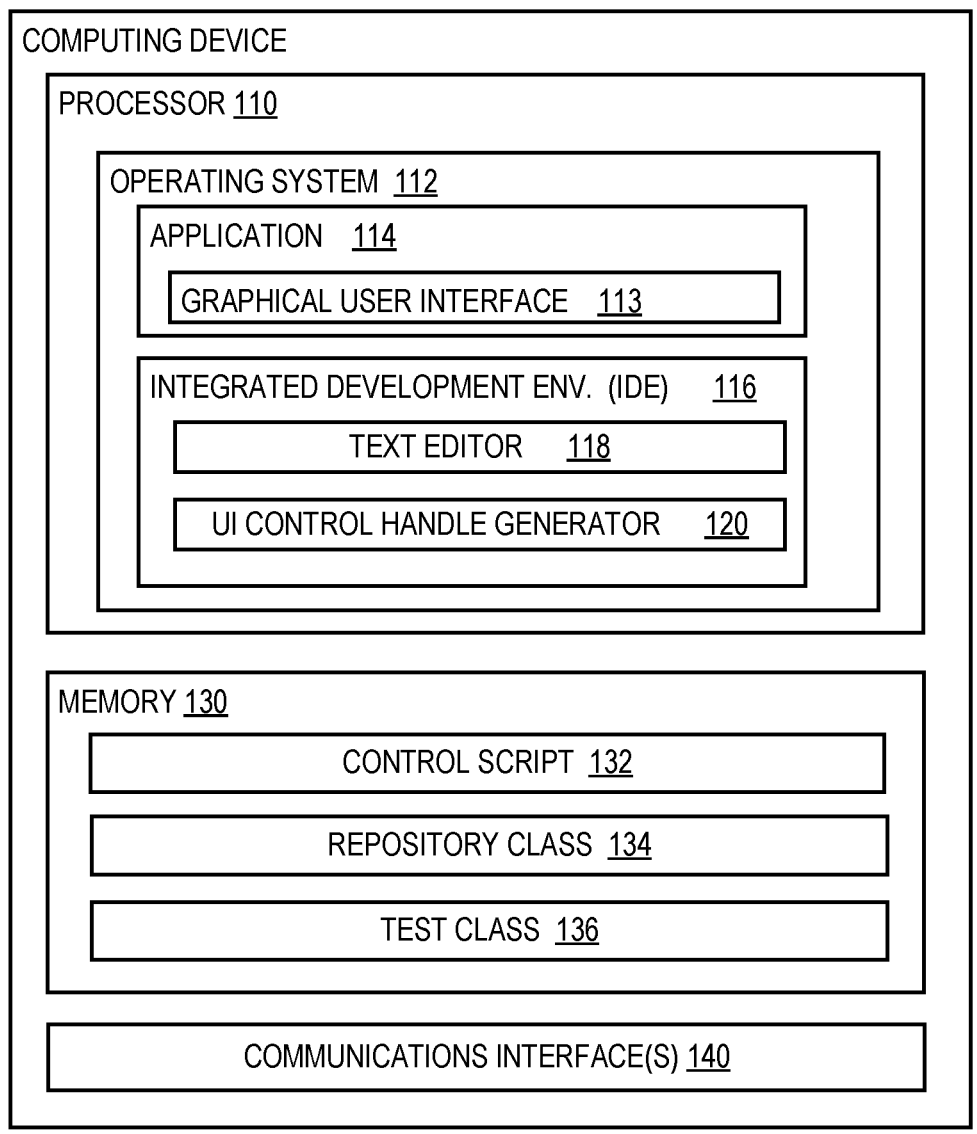
FIG. 1 is a diagram of an example of a system, according to aspects of the disclosure.

FIG. 1 is a diagram of an example of a computing device 100, according to aspects of the disclosure. As illustrated, computing device 100 may include a processor 110, a memory 130, and communications interface(s) 140. The processor 110 may include one or more of a general-purpose processor, a digital signal the processor (DSP), an application-specific integrated circuit (ASIC), a special-purpose processor, a field-programmable gate array (FPGA), and/or any other suitable type of processing circuitry. The memory 130 may include any suitable type of volatile or non-volatile memory, such as an electrically-erasable programmable read-only memory (EEPROM), dynamic random-access memory (DRAM), and/or any other suitable type of memory. The communications interface(s) 140 may include one or more of a radio transceiver, a modem, and/or any other suitable type of communications interface.

The processor 110 may be configured to execute an operating system 112. The operating system 112 may include the Windows™ operating system, Linux, and/or any other suitable type of operating system. Inside the operating system 112, the processor 110 may execute an application 114 and an integrated development environment (IDE) 116. Application 114 may include a graphical user interface (GUI) 113. The IDE 116 may be used to code, debug, and/or test the application 114. The IDE 116 may include Visual Studio™, NetBeans™, and/or any other suitable type of IDE. According to the present example, the IDE 116 includes a text editor 118 and a UI control handle generator 120 (hereinafter "generator 120"). The operation of the generator 120 is discussed further below with respect to FIGS. 2-8. Although not shown in FIG. 1, the IDE 116 may include an object browser, a debugger, and/or any other component that is commonly found in IDE tools.

The memory 130 may be configured to store a control script 132, a repository class 134, and a test class 136. The control script 132 may identify properties of one or more UI controls of application 114. The control script 132 is discussed further below with respect to FIGS. 4-5. The repository class 134 may include a different respective handle for each (or at least some) of the UI controls whose properties are identified in the control script 132. An example of repository class 134 is discussed further below with respect to FIG. 6. The test class 136 may include one or more test cases that use handles for different UI controls in the user interface 113, which are provided by the repository class 134. An example of the test class 136 is discussed further below with respect to FIG. 7.

Figure 2:
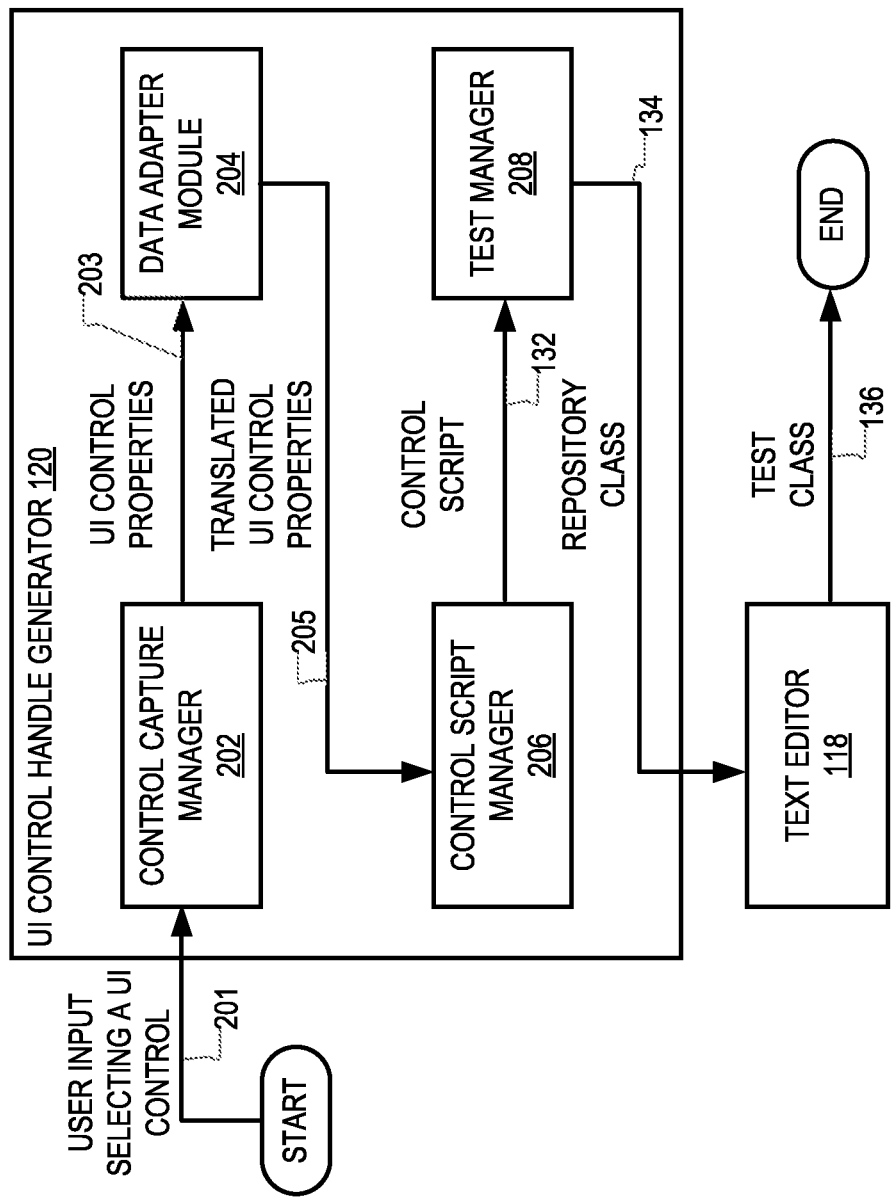
FIG. 2 is a diagram illustrating aspects of the operation of the system of FIG. 1, according to aspects of the disclosure.

FIG. 2 is a diagram illustrating aspects of the operation of the generator 120, according to one possible implementation. As illustrated, the UI control handle generator 120 may include a control capture manager 202 (hereinafter "manager 202"), a data adapter module 204, a control script manager 206 (hereinafter "manager 206"), and a test manager 208 (hereinafter "manager 208").

Manager 202 is responsible for capturing properties (e.g., Name, ID, etc.) of UI controls in user interface 113 of application 114. In operation, the user may launch the application 114. Next, the user may activate the generator 120. Next, the manager 202 may detect a user input 201 that selects one of the UI controls in the user interface 113. The user input 201 may include placing the mouse cursor over the UI control and pressing the lefthand button of the mouse. Next, manager 202 may identify which UI control of the user interface 113 has been selected. Next, manager 202 may retrieve the values of one or more properties 203 of the selected UI control. And finally, the manager 202 may provide the retrieved property values 203 to the data adapter module 204. Manager 202 may be implemented in the same or similar manner as the interface of CodedUI™, which also includes a selection tool that displays the properties of a UI control in response to the user clicking on the UI control.

The data adapter module 204 may translate the property values 203 to produce translated property values 205. The data adapter module 204 may provide the translated property values 205 to the manager 206. As noted above, property values 203 may be formatted (and/or encrypted) in accordance with a format that is specific to the technology used to create the user interface 113 (e.g., Oracle Forms, Java Swing, WPF, etc.). The translated property values 205 may be formatted (and/or encrypted) in accordance with a format that is compatible with manager 206 (hereinafter "a uniform format"). In some respects, the data adapter module 204 may include a plurality of adapters, wherein each adapter is associated with a different technology for creating user interfaces. Each of the adapters may be configured to translate, into the uniform format, values that are formatted in accordance with the format of the adapter's respective technology.

In operation, the data adapter module 204 may receive the property values 203. Next, the data adapter module 204 may identify a technology whose format the property values 203 are formatted in accordance with. Next, the data adapter module 204 may select one of the plurality of adapters that are associated with the technology whose format the property values 203 are formatted in accordance with. Next, the data adapter module 204 may use the selected adapter to translate into a uniform format the property values 203 and produce the property values 205 as a result. And finally, the data adapter module 204 may provide the translated values 205 to the manager 206.

The manager 206 may be configured to receive the property values 205. Next, manager 206 may generate a UI control definition based on the received property values 205. Next, manager 206 may insert the UI control definition into the control script 132. And finally, manager 206 may provide the control script 132 to manager 208. In some implementations, the manager 206 may create (e.g., "initialize") the control script 132 before inserting the UI control definition into the control script 132.

Manager 208 may be configured to retrieve the UI control definition for the selected UI control from the control script 132. Next, the manager 208 may generate a handle based on the control definition. The generated handle may include a function that returns an object referencing the selected UI control. Next, the manager 208 may insert the generated handle into the repository class 134. And finally, the manager 208 may make the repository class 134 available for use by other components of the IDE 116, such as the text editor 118.

In text editor 118, the user may type a test class including one or more test cases. At least one of the test cases may use the handle generated by the manager 208 to push test data onto the selected UI control.

In the present example, each of manager 202, data adapter module 204, manager 206, and manager 208 is implemented in software. However, alternative implementations are possible in which any of manager 202, data adapter module 204, manager 206, and manager 208 is implemented in hardware or as a combination of software and hardware. Although in the example of FIG. 2 only one UI control of the user interface 113 is selected with manager 202, it will be understood that in some instances more than one UI control may be selected. In such instances, the manager 206 may create a respective UI control definition for each of the selected UI controls, and insert it into the control script 132. Moreover, based on the UI control definitions, the manager 208 may create a respective handle for each of the selected UI controls and insert it into the repository class 134. In some implementations, the manager 206 may create (e.g., "initialize") the control script 132 before inserting any UI control definitions into the control script 132. In some implementations, the manager 208 may create (e.g., "initialize") the repository class 134 before inserting any handles into the repository class 134.

Figure 3:
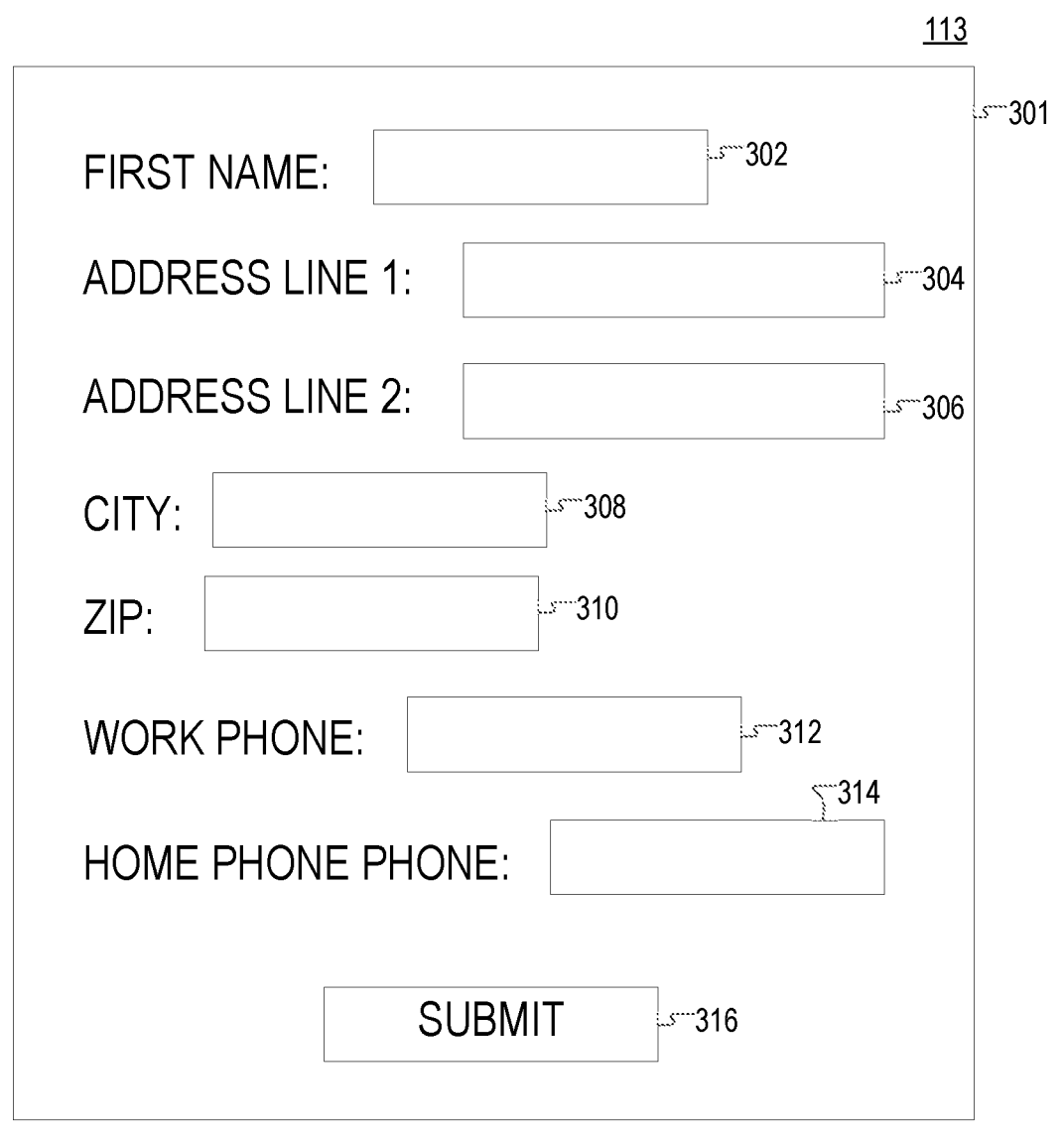

FIG. 3 is a diagram of an example of the user interface 113, according to aspects of the disclosure. As illustrated, the user interface 113 may include a window 301 and UI controls 302-316. UI control 302 may include a text box; UI control 304 may include a text box; UI control 306 may include a text box; UI control 308 may include a text box; UI control 310 may include a text box; UI control 312 may include a text box; UI control 314 may include a text box; and UI control 316 may include a button. According to the present example, UI controls 302-316 are instantiated within the memory space of window 301. Under the nomenclature of the present disclosure, two UI controls are related if one of the controllers is instantiated within the memory space of the other. Under this nomenclature, each of the UI controls 302-316 is an "unrelated" UI control to any other one of UI controls 302-316, and each of the UI controls 302-316 is a "related UI control" to window 301. Although the UI controls that are shown in FIG. 3 include only textboxes and a button, it will be understood that the concepts and ideas presented throughout the disclosure can be applied to any type of UI control, such as a button, a checkbox, a combo box, a label, a list, and/or a scrollbar.

FIG. 4 is a diagram of an example of the control script 132, according to one implementation. As illustrated, the control script 132 may include a plurality of UI control definitions 402 that correspond to different respective UI controls in the user interface 113 of the application 114. In addition, the control script 132 may include a definition 404 corresponding to the window 301 and a definition 406 that corresponds to the application 114. Each of the UI control definitions 402 may identify a different respective one of the UI controls 302-316 in the user interface 113. Each of the UI control definitions 402 may identify the values of one or more properties of the definition's respective UI control. Definition 404 may identify the values of one or more properties of window 301. Definition 406 may identify the values of one or more properties of application 114. In some respects, the control script 132 may include all (or at least some) of the information that is necessary for a testing function to target UI controls whose definitions are present in the control script 132. Examples of specific testing functions are discussed further below with respect to FIG. 7.

FIG. 5 is a partial view of an example of the control script 132, according to one implementation. As illustrated, the control script 132 may include UI control definitions 510-530.

UI control definition 510 may correspond to UI control 302. UI control definition 510 may include portions 512 and 514. Portion 512 may include an identifier that is assigned to the UI control 302 (or the definition 510) by the generator 120. Optionally, the assigned identifier may exist within the naming space of the control script 132, but not within the naming space of the user interface 113 (or application 114). The assigned identifier may be used by the repository class 134 for the purpose of referencing the data that is included in portion 514. Portion 514 may identify the values of one or more properties of the UI control 302. For each of the identified properties, portion 514 may contain an indication of the type of the property and an indication of the value of the property. As illustrated, portion 514 may identify the name of the UI control 302 by which the UI control is referred to within the namespace of application 114 (or user interface 113). In addition, portion 514 may identify the technology name and type of the UI control 302.

UI control definition 520 may correspond to UI control 304. UI control definition 520 may include portions 522 and 524. Portion 522 may include an identifier that is assigned to the UI control 304 (or the definition 520) by the generator 120. Optionally, the assigned identifier may exist within the naming space of the control script 132, but not within the naming space of the user interface 113 (or application 114). The assigned identifier may be used by the repository class 134 for the purpose of referencing the data that is included in portion 524. Portion 524 may identify the values of one or more properties of the UI control 304. For each of the identified properties, portion 524 may contain an indication of the type of the property and an indication of the value of the property. As illustrated, portion 524 may identify the name of the UI control 304 by which the UI control is referred to within the namespace of application 114 (or user interface 113). In addition, portion 524 may identify the technology name and type of the UI control 304.

UI control definition 530 may correspond to UI control 312. UI control definition 530 may include portions 532 and 534. Portion 532 may include an identifier that is assigned to the UI control 312 (or the definition 530) by the generator 120. Optionally, the assigned identifier may exist within the naming space of the control script 132, but not within the naming space of the user interface 113 (or application 114). The assigned identifier may be used by the repository class 134 for the purpose of referencing the data that is included in portion 534. Portion 534 may identify the values of one or more properties of the UI control 312. For each of the identified properties, portion 534 may contain an indication of the type of the property and an indication of the value of the property. As illustrated, portion 534 may identify the name of the UI control 312 by which the UI control is referred to within the namespace of application 114 (or user interface 113). In addition, portion 534 may identify the technology name and type of the UI control 312.

In the example of FIG. 5, the properties whose values are identified in each of definitions 510-530 include Name, TechnologyName, and Control type. However, alternative implementations are possible in which the values of any of those properties are omitted from one or more of definitions 510-530. Additionally or alternatively, in some implementations, the values of other properties may be inserted in any of definitions 510-530, such as ControlType, Name, FriendlyName, ID, TechnologyName, and Class for example.

FIG. 6 is a diagram of repository class 134, according to aspects of the disclosure. According to the present example, the repository class 134 is generated by the generator 120 based on the control script 132. As illustrated, the repository class 134 may include handles 610-630.

Handle 610 may be generated, by generator 120, based on UI control definition 510. Handle 610 may be an accessor function that returns a WinEdit object (or another object) that references UI control 302, and which is generated based on the property values of UI control 302 that are listed in the UI control definition 510. As illustrated, handle 610 references the property values for UI control 302 by the ID 512, which is generated by generator 120, and which is assigned (or mapped) to UI control definition 510 in the control script 132. In other words, in some implementations, the repository class 134 may import the namespace of the control script 132, which allows the handle 610 (as well as other handles) to reference the property values for a control by an identifier for the control that is unique, and/or which is assigned to the control by the generator 120 when the control script 132 is generated.

Handle 620 may be generated, by generator 120, based on UI control definition 520. Handle 620 may be an accessor function that returns a WinEdit object (or another object) that references UI control 304, and which is generated based on the property values of UI control 304 that are listed in the UI control definition 520. As illustrated, handle 620 references the property values for UI control 304 by the ID 522, which is generated by generator 120, and which is assigned (or mapped) to UI control definition 520 in the control script 132.

Handle 630 may be generated, by generator 120, based on UI control definition 530. Handle 630 may be an accessor function that returns a WinEdit object (or another object) that references UI control 312, and which is generated based on the property values of UI control 312 that are listed in the UI control definition 530. As illustrated, handle 630 references the property values for UI control 312 by the ID 532, which is generated by generator 120, and which is assigned (or mapped) to UI control definition 530 in the control script 132.

As used throughout the disclosure, the term "handle" shall refer to a function or other code that, at least in part, returns an object for handling a UI control. Although the term "handle" could conceivably refer to the object that is being returned, under the nomenclature of the present disclosure, the term "handle" refers to code that, at least in part, provides access to the object, and which can be invoked in test cases to gain access to the object.

In addition, the repository class 134 may include a line 601 where the parent window identification starts. Although not shown, in some implementations, the repository class 134 may include a line importing the namespace of the control script 132.

FIG. 7 is a diagram of the test class 136, according to one implementation. As illustrated, test class 136 includes a test case 702. The test case 702 may include lines 710-730.

Line 710 is a call to a test function SendKeys which pushes test string "Oscar" on the UI control 302. The test function takes as a parameter a reference to the UI control 302, which is obtained by calling handle 610, as well as the string "Oscar". Executing the SendKeys function causes the UI control 302 to behave as if a user has manually typed the string "Oscar" in the UI control 302.

Line 720 is a call to the test function SendKeys which pushes the test string "1 Elm St." on the UI control 304. The test function takes as a parameter a reference to the UI control 304, which is obtained by calling handle 620, as well as the string "1 Elm St.". Executing the SendKeys function causes the UI control 304 to behave as if a user has manually typed the string "1 Elm St." in the UI control 304.

Line 730 is a call to the test function SendKeys which pushes test number "401.001.0001" on the UI control 312. The test function takes as a parameter a reference to the UI control 312, which is obtained by calling handle 630, as well as the number "401.001.0001". Executing the SendKeys function causes the UI control 312 to behave as if a user has manually typed the string "401.001.0001" in the UI control 312.

According to the example of FIG. 7, the test function in each of lines 710-730 is a function that emulates the typing of text into a textbox. However, alternative implementations are possible in which the test case 702 includes calls to other types of test functions, such as a test function that emulates the checking of a checkbox, a function that emulates the pressing of a button, a function that emulates the hovering of a mouse cursor over a particular location, and/or any other test function. In the example of FIG. 7, the test functions used by the test case 702 include test functions that are provided by the CommonMethods class of CodedUI™, alternative implementations are possible in which any suitable type of test function API is used.

Figure 8:
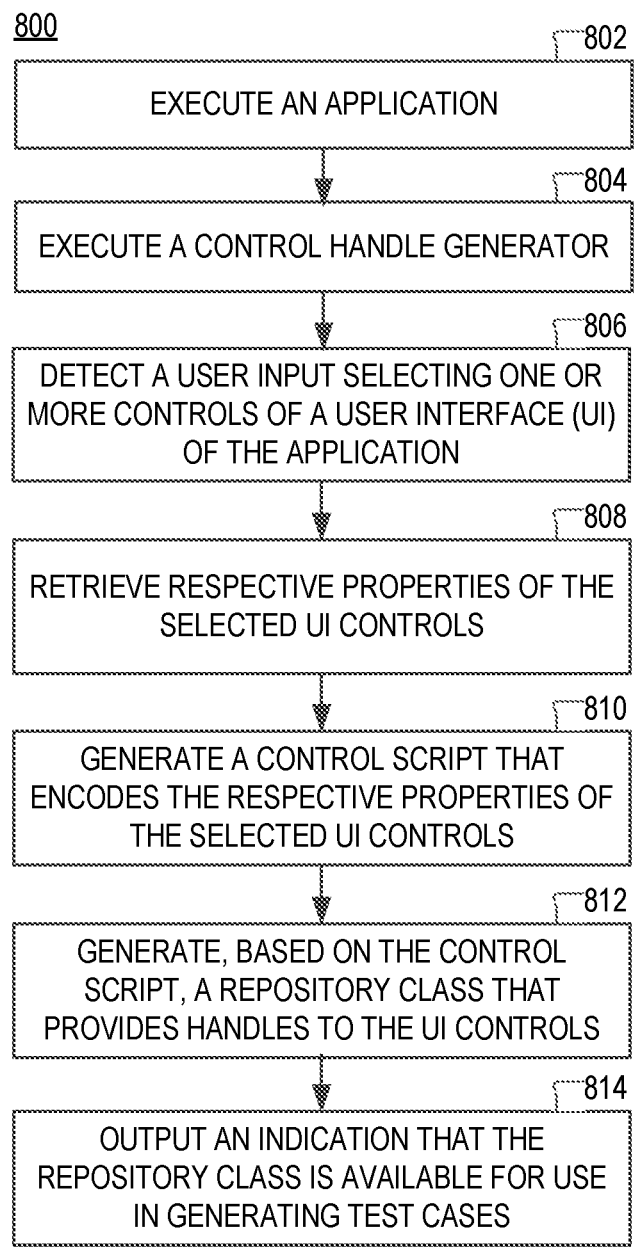
FIG. 8 is a flowchart of an example of a process, according to aspects of the disclosure.

FIG. 8 is a flowchart of an example of a process 800, according to aspects of the disclosure.

At step 802, the computing device 100 executes the application 114 and displays the user interface 113 of the application 114.

At step 804, the computing device 100 detects user input for activating the generator 120. The user input may include opening a menu of plugins that are available for the IDE 116 and selecting, from the menu, a menu item that corresponds to the generator 120. In response to the user input for activating the generator 120, the computing device 100 executes the generator 120.

At step 806, the computing device 100 detects user input selecting one or more UI controls that are part of the user interface 113. In some implementations, the user may select a control in the user interface 113 by activating a selection tool that is part of the user interface of generator 120 and clicking on the UI control that the user wishes to select. In some implementations, the user may select multiple UI controls of the user interface 113 by clicking on the UI controls.

At step 808, the generator 120 retrieves the respective properties of the selected UI controls. Specifically, for each of the selected UI controls, the generator 120 may receive data that identifies the value and/or type of one or more properties of the UI control. In some implementations, the generator 120 may use a data adapter to convert the data set from a technology-specific format to a uniform format. The data adapter may be part of a data adapter module, such as the data adapter module 204, which is discussed above with respect to FIG. 2.

At step 810, the generator 120 generates a control script based on the respective properties of the UI controls, which are retrieved at step 808. The generated control script may be the same or similar to the control script 132, which is discussed above with respect to FIG. 5. The generated control script may include a different respective UI control definition for each of the UI controls selected at step 806. Any of the UI control definitions may be the same or similar to one or more of UI control definitions 510-530, which are discussed above with respect to FIG. 5. Generating the control script may include: (i) instantiating a script file, (ii) generating a plurality of UI control definitions, and (iii) including each of the generated UI control definitions into the script file. The script file may include a JSON file, a markup language file, a text file, and/or any other suitable type of file. Generating any of the UI control definitions may include: (i) identifying one of the UI controls (selected at step 806), (ii) instantiating a new UI control definition for the identified UI control, (iii) assigning an identifier to the identified UI control (or instantiated control definition), (iv) inserting the assigned identifier in a first portion of the instantiated UI control definition, (v) obtaining property values of the identified UI control, which are retrieved at step 808, and (vi) inserting the obtained property values into a second portion the instantiated UI control definition. The first portion of each instantiated UI control definition may have the same or similar format and/or content to any of portions 512, 522, and 532, which are discussed above with respect to FIG. 5. The second portion of each instantiated UI control definition may have the same or similar format and content to any of portions 514, 524, and 534, which are discussed above with respect to FIG. 5.

At step 812, the generator 120 generates a repository class based on the control script (generated at step 810). The generated repository class may be the same or similar to repository class 134, which is discussed above with respect to FIG. 6. The generated repository class may include a plurality of handles. Each of the handles may correspond to a different one of the UI controls (selected at step 806). Each of the handles may be configured to return an object referencing the handle's corresponding UI control, which can be used by a test function to push a particular input on the corresponding UI control. Each of the handles may be generated based on the UI control definition (for the handle's corresponding UI control), which is provided in the control script (generated at step 812).

At step 814, the computing device 100 outputs an indication that the repository class has been generated, and is available for use in various test cases.

In some implementations, the repository class (generated at step 812) may include only handles for UI controls that are selected at step 806. For instance, if the user selects UI controls 302 and 304, the repository class would include handles for UI controls 302 and 304. On the other hand, if the user does not select UI controls 306 and 308, handles for UI controls 306 and 308 may be absent from the repository class. Additionally or alternatively, in some implementations, the repository class may include handles for UI controls that are related to the selected UI controls, but which are not selected (such as a handle for the window 301). Additionally or alternatively, in some implementations, the repository class may not include handles for UI controls that are unrelated to the selected UI controls, and which are themselves not selected. As noted above, limiting the repository class to including only the handles for selected UI controls (and possibly UI controls that are related to the selected UI controls) is advantageous because it simplifies the structure of the repository class, thus increasing the efficiency at which the repository class can be used by software engineers to test the application 114.

In some implementations, the control script (generated at step 810) may include only UI control definitions for UI controls that are selected at step 806. For instance, if the user selects UI controls 302 and 304, the control script would include handles for UI controls 302 and 304. On the other hand, if the user does not select UI controls 306 and 308, definitions for UI controls 306 and 308 may be absent from the control script. Additionally or alternatively, in some implementations, the control script may include also include definitions for UI controls that are related to the selected UI controls, but which are not selected. Additionally or alternatively, in some implementations, the control script may not include handles for UI controls that are unrelated to the selected UI controls, and which are themselves not selected.

FIGS. 1-8 are provided as an example only. At least some of the steps discussed with respect to FIGS. 1-8 can be performed in a different order, in parallel, or altogether omitted. Although in the example of FIGS. 1-8 the generator 120 is an IDE plugin, alternative implementations are possible in which the generator 120 is implemented as a standalone application. Although in the example of FIG. 1-8 user interface components are selected by clicking on the UI controls (e.g., see step 806 of FIG. 8), alternative implementations are possible in which they are selected by any other input action (e.g., typing the names of UI controls that are desired to be selected, etc.). The term "UI control definition" may refer to any object, number, string, alphanumerical string, or another entity or set of entities, that identifies the values of one or more properties of a UI control. The terms "control script" or "control file" may refer to any file that includes a control definition.

For example, and without limitation, the phrase "generating a control file including one or more UI control definitions" may refer to at least one of: (i) instantiating a new file and inserting one or more newly-generated UI control definitions in the new file, or (ii) inserting one or more newly-generated UI control definitions into a pre-existing file. The pre-existing file may be empty or it may include other UI control definitions and/or other content.

For example, and without limitation, the phrase "generating a repository class including one or more handles" may refer to at least one of: (i) instantiating a new class and inserting one or more newly-generated handles into the new class, or (ii) inserting one or more newly-generated handles into a pre-existing class. The pre-existing class may be empty or it may include other handles and/or other content.

The term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method, comprising:
   detecting a selection of one or more user interface (UI) controls in a user interface of an application;
   retrieving a respective property value set for each of the selected UI controls, the respective property value set for any of the selected UI controls including respective values of one or more properties of the selected UI control;
   generating a control file, the control file including one or more UI control definitions, each of the UI control definitions corresponding to a different one of the selected UI controls, each of the UI control definitions being generated based on the respective property value set for the UI control that corresponds to the UI control definition, each of the UI control definitions including a name of the UI control definition's corresponding UI control by which the corresponding UI control is referred to within a namespace of the application;
   generating a repository class including one or more handles, each of the UI handles being associated with a different respective one of the selected UI controls, each of the handles being configured to return an object corresponding to the handle's associated UI control, each of the handles being generated based on a different one of the UI control definitions that are part of the control file; and
   testing the application by using a test script that is configured to activate any given one of the UI controls by calling the given UI control's associated handle.

2. The method of claim 1, wherein generating the control file includes generating a respective identifier for each of the selected UI controls and including the generated identifier in the UI control definition that corresponds to the UI control.

3. The method of claim 1, wherein each UI control definition identifies respective values for one or more properties of the UI control that corresponds to the UI control definition.

4. The method of claim 1, wherein each UI control definition includes one or more data pairs, each data pair including: (i) an identifier of a type of a property of the UI control that corresponds to the UI control definition, and (ii) a value of the property.

5. The method of claim 1, wherein the control file and the repository class are generated by a handle generator, and each of the handles is arranged to reference the UI control definition which the handle is generated based on by using an identifier of the UI control definition that is assigned to the UI control definition by the handle generator.

6. The method of claim 1, wherein the control file includes a JavaScript Object Notation (JSON) file.

7. The method of claim 1, wherein at least one of the selected UI controls includes one of a textbox, a button, a radio button, or a checkbox.

8. A system, comprising:
one or more processors configured to perform the operations of:
detecting a selection of one or more user interface (UI) controls in a user interface of an application;
retrieving a respective property value set for each of the selected UI controls, the respective property value set for any of the selected UI controls including respective values of one or more properties of the selected UI control;
generating a control file, the control file including one or more UI control definitions, each of the UI control definitions corresponding to a different one of the selected UI controls, each of the UI control definitions being generated based on the respective property value set for the UI control that corresponds to the UI control definition, each of the UI control definitions including a name of the UI control definition's corresponding UI control by which the corresponding UI control is referred to within a namespace of the application; and
generating a repository class including one or more handles, each of the UI handles being associated with a different respective one of the selected UI controls, each of the handles being configured to return an object corresponding to the handle's associated UI control, each of the handles being generated based on a different one of the UI control definitions that are part of the control file; and
testing the application by using a test script that is configured to activate any given one of the UI controls by calling the given UI control's associated handle.

9. The system of claim 8, wherein generating the control file includes generating a respective identifier for each of the selected UI controls and including the generated identifier in the UI control definition that corresponds to the UI control.

10. The system of claim 8, wherein each UI control definition identifies respective values for one or more properties of the UI control that corresponds to the UI control definition.

11. The system of claim 8, wherein each UI control definition includes one or more data pairs, each data pair including: (i) an identifier of a type of a property of the UI control that corresponds to the UI control definition, and (ii) a value of the property.

12. The system of claim 8, wherein the control file and the repository class are generated by a handle generator, and each of the handles is arranged to reference the UI control definition which the handle is generated based on by using an identifier of the UI control definition that is assigned to the UI control definition by the handle generator.

13. The system of claim 8, wherein the control file includes a JavaScript Object Notation (JSON) file.

14. The system of claim 8, wherein at least one of the selected UI controls includes one of a textbox, a button, a radio button, or a checkbox.

15. A non-transitory computer-readable medium storing one or more processor-executable instructions which, when executed, by one or more processors cause the one or more processors to perform the operations of:
detecting a selection of one or more user interface (UI) controls in a user interface of an application;
retrieving a respective property value set for each of the selected UI controls, the respective property value set for any of the selected UI controls including respective values of one or more properties of the selected UI control;
generating a control file, the control file including one or more UI control definitions, each of the UI control definitions corresponding to a different one of the selected UI controls, each of the UI control definitions being generated based on the respective property value set for the UI control that corresponds to the UI control definition, each of the UI control definitions including a name of the UI control definition's corresponding UI control by which the corresponding UI control is referred to within a namespace of the application; and
generating a repository class including one or more handles, each of the UI handles being associated with a different respective one of the selected UI controls, each of the handles being configured to return an object corresponding the handle's associated UI control, each of the handles being generated based on a different one of the UI control definitions that are part of the control file; and
testing the application by using a test script that is configured to activate any given one of the UI controls by calling the given UI control's associated handle.

16. The non-transitory computer-readable medium of claim 15, wherein generating the control file includes generating a respective identifier for each of the selected UI controls and including the generated identifier in the UI control definition that corresponds to the UI control.

17. The non-transitory computer-readable medium of claim 15, wherein each UI control definition identifies respective values for one or more properties of the UI control that corresponds to the UI control definition.

18. The non-transitory computer-readable medium of claim 15, wherein each UI control definition includes one or more data pairs, each data pair including: (i) an identifier of a type of a property of the UI control that corresponds to the UI control definition, and (ii) a value of the property.

19. The non-transitory computer-readable medium of claim 15, wherein the control file and the repository class are generated by a handle generator, and each of the handles is arranged to reference the UI control definition which the handle is generated based on by using an identifier of the UI control definition that is assigned to the UI control definition by the handle generator.

20. The non-transitory computer-readable medium of claim 15, wherein the control file includes a JavaScript Object Notation (JSON) file.

* * * * *